Sept. 27, 1966   P. H. CROFT   3,275,206
SPORTS CYCLE CARRIERS
Filed Dec. 29, 1964   2 Sheets-Sheet 1
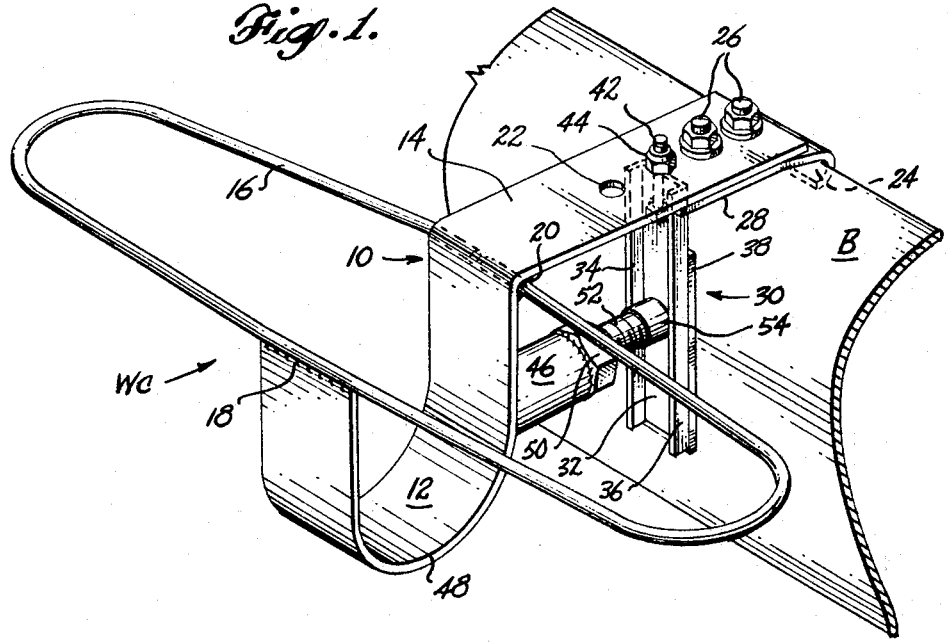
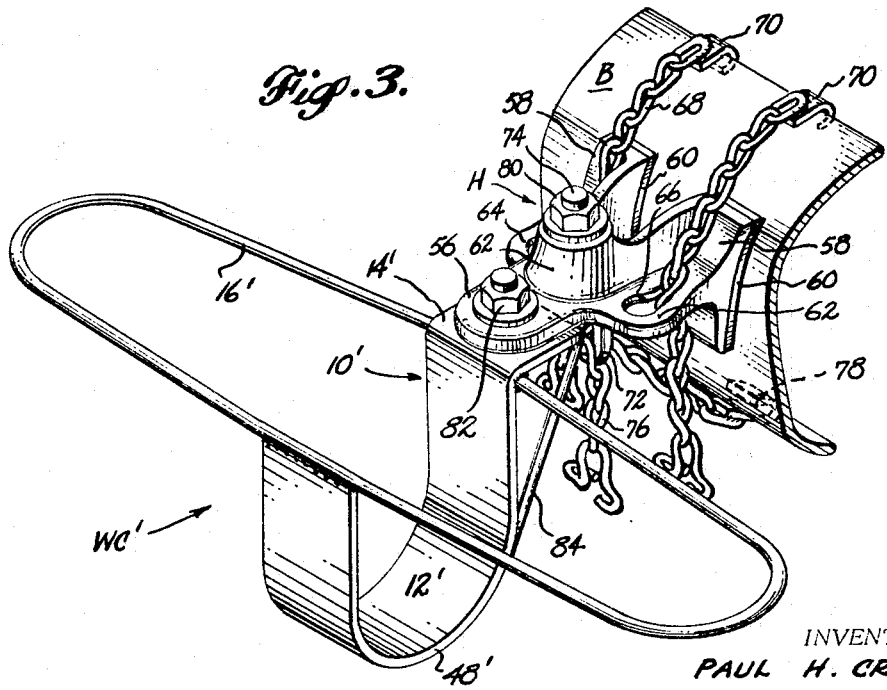
INVENTOR.
PAUL H. CROFT
BY Graybeal, Cole & Barnard
ATTORNEYS

INVENTOR.
PAUL H. CROFT
ATTORNEYS

United States Patent Office 3,275,206
Patented Sept. 27, 1966

3,275,206
SPORTS CYCLE CARRIERS
Paul H. Croft, 7241 S. Tacoma Way, Tacoma, Wash.
Filed Dec. 29, 1964, Ser. No. 421,980
4 Claims. (Cl. 224—42.03)

The present invention relates to carriers for two-wheeled vehicles, and more particularly to wheel chock attachments adapted to be used in pairs on an automotive vehicle bumper to provide a carrier for a two-wheeled vehicle, such as a motorcycle or scooter used by outdoorsmen, or bicycle, and the like.

In recent years outdoorsmen have been using two-wheeled motorcycles or scooters for off-highway and off-road travel. For example, hunters and fishermen use them in rugged, mountainous or wooded terrain. Others use them on ranches, for beach travel, and on camping trips. These vehicles are used for traveling where cars cannot travel, to traverse terrain that would ordinarily be accessible only by foot. The transportation of such vehicles to and from their place of use presents serious problems to persons who do not own or have available to them a truck or other motor vehicle having sufficient baggage space to hold both the cycle or scooter and other cargo that must be taken along for use on the outing. Similarly, the transportation of an ordinary bicycle is a problem when the mother vehicle possesses insufficient baggage space.

A principal object of the present invention is to provide a carrier for two-wheeled vehicles that is especially adapted to be mounted onto either the front or rear bumper of a motor vehicle having a limited baggage capacity, such as a passenger sedan, station wagon, or camper, for example, or on any automotive vehicle for that matter. According to the invention, the carrier comprises a pair of wheel chock attachments, each including a wheel chock comprising means for underlying and encircling a portion of either the front or rear tired wheel of the cycle or scooter, and means for mounting said wheel chocks onto a bumper.

Another object of the present invention is to provide a wheel chock attachment which is capable of being quickly and securely mounted on any one of the wide variety of rear bumpers as may be presented by the various makes of automotive vehicles.

A further object of the present invention is to provide a fully adjustable, sturdy, easily and properly installable, and easily detachable wheel chock attachment capable of use on essentially any type of front or rear bumper contour.

According to the invention, one form of wheel chock attachment is self-contained, i.e. it includes its own mounting mechanism, and another form is adapted to be mounted onto a bumper by a standard trailer hitch bumper clamp.

Cycle or scooter carriers of the present invention, involving bumper attachable wheel chocks, are especially attractive as rental items, to be rented in conjunction with or apart from the cycle or scooter with which they are to be used. However, the versatility of the wheel chock attachments in meeting installation requirements of essentially any type of motor vehicle also makes them attractive as items for unit sale, in that the retailer need have on hand only one model of attachment, thereby reducing inventory requirements.

These characteristics as well as other features of sports cycle carriers embodying the invention will be apparent to those skilled in the art to which the present invention is addressed, from the following description and accompanying illustrations of various typical and therefore non-limitive forms thereof, wherein like numerals refer to like parts, and wherein:

FIGURE 1 is perspective view of a perferred form of wheel chock attachment characteristic of cycle carriers according to the present invention, such form of wheel chock attachment including its own mounting means by which it may be universally installed onto automotive rear bumpers of widely variant contours;

FIGURE 3 is a perspective view similar to that of FIGURE 1, showing a modified form of wheel chock attachment according to the present invention, having no bumper mounting means of its own, but rather adapted to be mounted onto a bumper by means of a standard trailer hitch;

Figure 2:
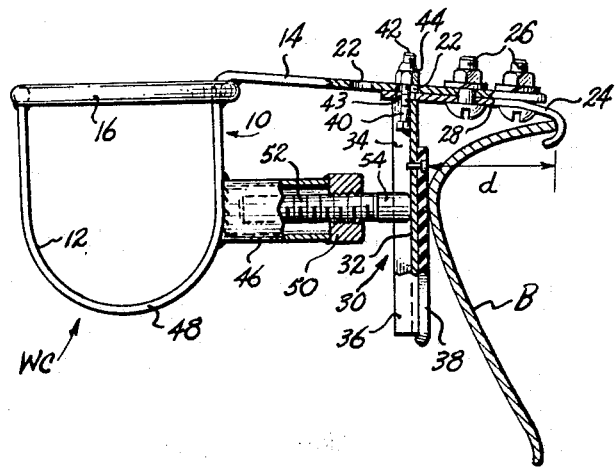
FIGURE 2 is a side elevational view of the wheel chock attachment shown in FIGURE 1, with parts of the longitudinally adjustable bumper edge engaging means, and parts of the adjustable knee brace, being cut away for clarity of illustration.
Figure 4:
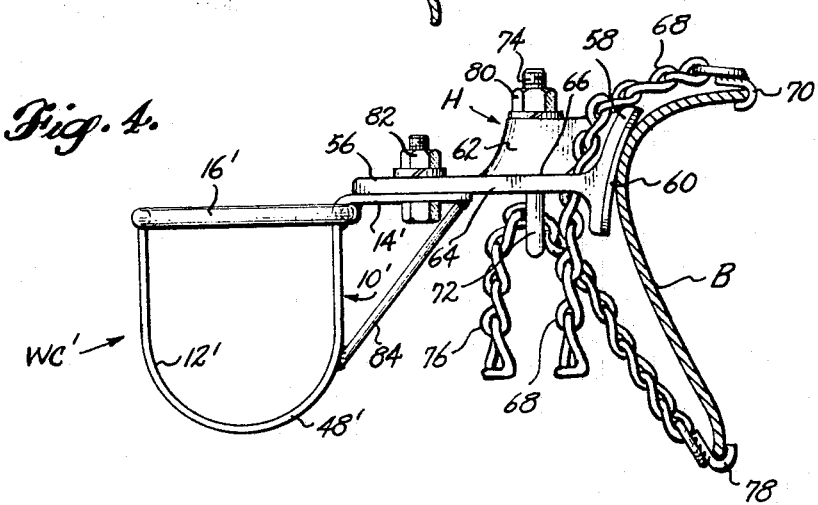
Figure 5:
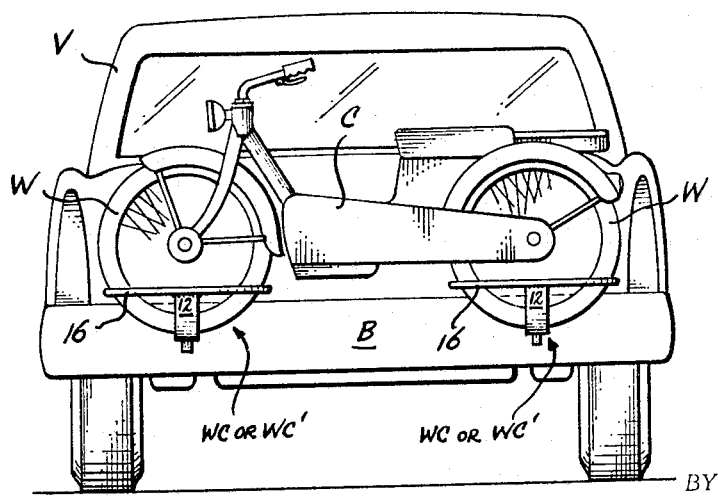

FIGURE 4 is a side elevational view similar to FIGURE 2, but relating to the modified form of wheel chock attachment shown by FIGURE 3; and FIGURE 5 is an elevational view taken from an aspect looking toward the rear-end of an automobile, with a pair of wheel chock attachments according to the present invention being mounted onto the rear bumper of such vehicle, at laterally spaced locations, and with the two wheels of a sports cycle or scooter being cradled in the wheel chocks.

One form of wheel chock attachment WC according to the invention, as shown in FIGURES 1 and 2 in mounted position on an automotive bumper B, comprises a relatively thin bar 10 of mild steel or the like configured to form an upwardly opening, U-shaped cradle 12, forming a part of the wheel chock, and a generally horizontal tongue or panel portion 14, forming a part of an adjustable mounting means for the wheel chock.

The wheel chock also includes an oblong wheel retaining hoop 16, which is preferably formed from a single piece of circular steel rod, or the like, configured in the manner illustrated by FIGURE 1, and welded or otherwise secured to the bar 10 at 18 and 20. As clearly shown by FIGURES 1 and 2, the general plane of the hoop 16 is substantially horizontally disposed during use, and the general plane of the cradle 12 is substantially vertical, with cradle 12 depending below the hoop 16.

The tongue 14 is formed to include a series or row of evenly spaced openings 22. A bumper edge engaging means or hook 24, preferably configured from the same material as tongue 14, is adjustably secured to the tongue 14 by means of a pair of nut and bolt assemblies 26. The bolts of such nut and bolt assemblies 26 extend through a selected pair of the openings 22 in the tongue 14, and also through corresponding openings in the generally flat shank 28 of hook 24.

A bumper contacting member 30 depends below the tongue 14. As clearly shown by FIGURES 1 and 2, the member 30 may comprise an elongated channel member consisting of a web 32 and a pair of flanges 34, 36. The side of the web 32 opposite the flanges 34, 36 faces forwardly, towards the bumper B. A resilient pad 38 of rubber or like material is secured to said forwardly facing side of web 32, to safeguard against damage of the bumper finish. An upstanding rod 40 is welded, or otherwise secured, at its lower end, to the upper end of member 30, and has an externally threaded upper end portion 42. As shown by FIGURE 2, the upper end portion 42 of rod 40 extends upwardly first through an opening 43 (FIGURE 2) in shank 28 of hook 24 and then an opening 22 in tongue 14, and is held in place by a nut 44. The diameter of rod 40 is smaller than the diameter of the openings 22, 43. As a result, when the wheel chock attachment WC is unmounted, the rod 40 loosely mounts the member 30 onto the tongue 14 for universal pivotal movement in a generally conically-shaped zone having its apex generally where the upper end portion 42 of rod 40 passes through the opening 22 in tongue 14.

According to this invention, the bumper contacting member 30 forms part of an adjustable knee brace. The adjustable knee brace also includes an adjustable brace arm comprising a screw housing 46, secured at its rear end, as by welding, to a forward intermediate portion of the cradle 12, substantially immediately above the bight portion 48 of such cradle 12. The screw housing 46 extends substantially parallel to the general plane of the hoop 16. It is provided with a head 50 at its forward end, having an internally threaded opening formed therethrough in which an externally threaded screw 52 extends. The forward end of screw 52 is provided with a head portion 54 that in use bears against the rear face of the web 32, between the two flanges 34, 36, as illustrated by FIGURE 2, for example.

Referring to FIGURES 1 and 2, the tongue 14 is shown to have been formed to include four openings 22, and the hook shank 28 to include three openings 43. In FIGURE 2, the bumper B is shown to be rather sharply curved. The forward pair of openings 22 are used for bolting the shank 28 (and hook 24) to the tongue 14. The third opening 22 (from the front) is used to mount the bumper contacting member 30 onto the tongue 14. In installations involving a bumper B having a much flatter curvature, and a dimension d substantially smaller than that illustrated in FIGURE 2, it may be necessary to move the hook 24 rearwardly one opening. This places the rearmost opening 43 in shank 28 in alignment with the rearmost opening 22 in tongue 14. One of the nut and bolt assemblies 26 is then associated with this pair of openings. The bumper contacting member 30 retains the same relative position with respect to the screw housing 46, but the rod 40 now extends first through the middle opening 43 in shank 28 before extending through the third (from the front) opening 22 in tongue 14. The forwardmost opening 43 in shank 28 is in alignment with the second (from the front) opening 22 in the tongue 14, and the second nut and bolt assembly 26 is employed with this set of openings.

The preferred procedure of installing the wheel chock attachment onto a bumper B will now be explained. After adjusting hook 24 along tongue 14 to fit the contour of the particular bumper B involved, the terminal hook 24 is hooked over the upper edge of the bumper B, and the entire attachment is swung downwardly (counterclockwise as viewed in FIGURE 2) until the screw housing 46 and hoop 16 are substantially horizontal. Next, the screw 52 is screwed in or out until its head 54 makes contact with the rear surface of web 32 at the same time that the front surface of pad 38 is in contact with the bumper crown and the screw housing 46 and the hoop 16 are substantially horizontal.

In FIGURE 5, a pair of wheel chock attachments WC are shown attached to the bumper B, in the manner described, at spaced apart locations. As will be evident, the center-to-center spacing of the cradles 12 of such attachments is substantially equal to the center-to-center spacing of the wheels W of the cycle or scooter C. The wheels W of the cycle C are placed into the wheel chocks, as illustrated by FIGURE 5. The cycle C may then be lashed to the pumper B and/or other parts of the vehicle V, in order to prevent the cycle from being bounced out of the wheel chocks, or the wheel chock attachments WC off from the bumper B.

FIGURES 3 and 4 illustrate a modified form of wheel chock attachment WC' according to the present invention. It does not possess mounting means of its own (i.e. it is not self-contained like attachment WC), but rather is mounted onto the bumper B by means of a standard trailer hitch clamp H, preferably of a type that is universally installable on automotive rear bumpers of widely variant contours.

Referring to FIGURES 3 and 4, the particular trailer hitch clamp H illustrated, constituting merely a typical and therefor nonlimitive example of trailer hitch clamps suitable for use with the modified form of wheel chock attachment WC', forms the subject matter of my copending application Serial No. 320,246, filed October 7, 1963, now Patent No. 3,178,204 as a continuation of my now-abandoned application Serial No. 133,126, filed August 22, 1961, both applications being entitled Universally Installable Trailer Hitch Bumper Clamp.

In FIGURES 3 and 4 the hitch H is shown to comprise a hitch ball mounting panel 56, a pair of butt plates 58 situated outboardly and forwardly of said panel 56, and each including a bumper engaging pad 60, of rubber or some other resilient material. A vertically enlongated bolt block housing 62 of box-like cross-section is situated between the panel 56 and the butt plates 58. The bolt lock housing 62 includes an internal cavity and a top having a post receiving opening. A relatively flat, generally horizontal panel 64 extends rearwardly from each butt plate 58. A keyhole opening 66 is formed in each such panel 64, with the enlarged, generally circular portion of such opening being rearwardly disposed, and the narrower, interconnecting slot portion being relatively forwardly disposed.

A chain 68, comprising a series of oval links, extends through each opening 66. The links are sized to freely pass through the enlarged portion of the keyhole opening 66, but to be retained when engaged in the slot portion of said opening 66. A bumper edge engaging hook 70 is attached to the upper end of each chain 68. A bolt block 72 is mounted for rectilinear movement in the internal cavity of the bolt block housing 62. The bolt block 72 is a relatively thin and flat plate member. It includes a keyhole opening (not shown) having an enlarged upper portion and a narower, interconnecting lower slot portion. A post 74 is attached at its lower end to the upper edge of said bolt block 72. Post 74 has a threaded upper end portion that extends upwardly through the said opening in the top of the bolt block housing 62. A chain 76, like chains 68, extends through the opening in bolt block 72, from back to front, and then downwardly toward the lower edge of the bumper B. A bumper edge engaging hook 78 is provided at the lower end of chain 76.

Referring to FIGURE 4, the upper chains 68 are adjusted in the keyhole openings 66 so that when the hooks 70 are engaged on the upper edge of the bumper B the hitch ball mounting panel 56 is substantially horizontal. The nut 80 on the threaded portion of post 74 is backed off so that the bolt block 72 is in a relative low position in the bolt block housing 62. The hook 78 of chain 76 is hooked onto the lower edge of the bumper B, and the chain 76 is then pulled upwardly through the keyhole opening in bolt block 72 until most of the slack in it is removed. Finally, the nut 80 is threaded in. This pulls bolt block 72 upwardly, and puts tension in both of the chains 68, and in chain 78. In this manner the hitch clamp H is firmly secured on the bumper B.

The hitch ball mounting panel 56 is formed to include a central opening. Normally a hitch ball is affixed to the hitch ball mounting panel 56, and a stem portion of such hitch ball extends through this opening. The hitch ball is removed when the bumper hitch clamp H is used to mount the wheel chock attachment WC' onto the bumper B.

As shown by FIGURES 3 and 4, the wheel chock attachment WC' includes a bar 10' configured to form a cradle 12' and a tongue 14'. An oblong hoop 16' encircles the upper end of the cradle 12'. The tongue 14' is relatively short in comparison with tongue 14 of wheel chock attachment WC. Tongue 14' may be provided with but a single opening for use in bolting it to the hitch ball mounting panel 56 of the bumper clamp, by means of a nut and bolt assembly 82. Preferably, a fixed knee brace means, in the form of one or two brace members 84, inclines upwardly and forwardly, from a location intermediate the forward part of cradle 12', substantially immediately above the bight 48', to the forward end portion of the tongue 14'. The brace member (or members) 84 may be welded at its two ends to the cradle 12' and the tongue 14', respectively.

Other types of universal trailer hitch bumper clamps usable for mounting the wheel chock attachment WC' onto an automotive bumper include, e.g., the hitch disclosed in my prior Patent No. 8,814,506, issued November 26, 1957, and entitled Universal Trailer Hitch Bumper Clamp, and the hitch disclosed in United States Patent No. 2,772,099, issued November 27, 1956, to Arthur F. Smith, and entitled Bumper Mount for Trailer Hitches.

Although in FIGURE 5 the cycle carrier assembly is shown to be mounted on the rear bumper of the vehicle V, it is to be understood that in some cases it may be more desirable to locate it on the front bumper.

One suitable and simple way of securing both the cycle C and the carrier means WC in place involves running a resilient line, with hooks at each end, up from where one end of said line is hooked onto the lower edge of bumper B to, then over and across the lowermost part of the tired wheel W, and then down again to the lower edge of the bumper B, and finally securing the second hook onto such lower edge. Alternatively, the resilient line might be secured to a part of, or an eye formed on, the attachment WC, and then led down to be hooked onto the lower edge of the bumper B. This latter arrangement would serve to secure only the attachments WC in place. The cycle C would then have to be locked or otherwise secured when transported in the carrier. The resilient line may be a coil spring covered by or encased in a sheath of rubber or the like.

These and other variations, modifications, adaptations, and feature characteristics of wheel chock attachments and cycle carrier assemblies according to the present invention will be apparent to those skilled in the art to which the present invention is addressed, within the scope of the following claims.

What is claimed is:

1. A wheel chock attachment for an automotive vehicle bumper, said attachment comprising means for underlying and supporting a portion of a cycle wheel, and mounting means connected thereto for mounting the attachment onto a bumper, and said mounting means including a forwardly extending tongue member having a terminal hook at its forward end for engaging the upper edge of the bumper, an elongated bumper contacting member depending downwardly from said tongue, rearwardly of said terminal hook, means pivotally mounting the upper end of said member onto said tongue, and brace means located below said tongue and comprising a screw housing including a head having a forwardly directed, internally threaded opening formed therein, and a screw threadable into and out from said opening, said screw having a head which bears against the rear of said bumper contacting member.

2. A wheel chock attachment for an automotive vehicle bumper, said attachment comprising a wheel chock including means for underlying and encircling a portion of a cycle wheel, and means for mounting said wheel chock onto a bumper, said means comprising a tongue member extending forwardly from said wheel chock, hook means secured to said tongue, for engaging the upper edge of the bumper, bumper contacting means connected to and extending below an intermediate portion of said tongue, rearwardly of said hook means, and means extending forwardly from said wheel chock, below said tongue, to support and brace said bumper contacting means from said wheel chock.

3. A wheel chock attachment for a automotive vehicle bumper, said attachment comprising: a wheel chock comprising a cradle means for extending below and supporting the bottom surface of a cycle wheel, and retaining hoop means secured to the upper portion of said cradle means, for encircling a lower portion of the wheel that is above said bottom surface, and in that manner retaining the wheel on the cradle means, said cradle means comprising a relatively thin but wide metallic bar of upwardly opening U configuration, having a bight portion for underlying and supporting the bottom surface of a cycle wheel, and front and rear wall portions, and the retaining hoop means consists of a metallic rod formed into an elongated closed hoop secured at two opposed locations intermediate its length to the respective upper ends of said front and rear wall portions of the U-shaped cradle; and adjustable means for mounting said wheel chock onto an automotive vehicle, comprising a tongue that is an integral forward extension of the cradle, a bar member formed to include a forwardly directed terminal hook, for engaging the upper edge of an automotive bumper, and a shank extending rearwardly from said terminal hook adjacent the tongue, means interconnecting said shank and said tongue and permitting fore and aft adjustment of the terminal hook relative to said tongue and said chock, a bumper crown contacting member depending below said tongue, and brace means extending from said wheel chock to said bumper contacting member.

4. A wheel chock attachment for an automotive vehicle bumper, said attachment comprising: a relatively thin metallic bar shaped to form an upwardly opening, generally U-shaped cradle, having front and rear walls and an interconnecting bight portion, and a generally flat tongue constituting a forward extension of the upper end of the forward wall of said cradle; an oblong wheel retaining hoop encircling the upper ends of the front and rear walls of the cradle, and having an elongated, generally parallel front and rear portions, interconnected at their ends by generally U-shaped bight portions, said front portion of the hoop being secured generally at its middle to the upper end of the front wall of the cradle, and said rear portion of the hoop being secured generally at its middle to the upper end of the rear wall of the cradle; bumper edge engaging hook means secured to said tongue; and support means comprising an elongated bumper contacting member depending downwardly from said tongue, and means pivotally mounting the upper end of said member onto said tongue, and a screw housing secured to the forward wall of said cradle, below the tongue, said housing including a head having a forwardly directed, internally threaded opening formed therein; and a screw threadable into and out from said opening, said screw having a head which bears against the rear of said bumper contacting member.

References Cited by the Examiner

UNITED STATES PATENTS

| | | | |
|---|---|---|---|
| Re. 15,027 | 1/1921 | Green | 224—42.12 |
| 1,389,344 | 8/1921 | Disalvo | 224—42.03 X |
| 1,442,285 | 1/1923 | McKay et al. | 224—42.26 |
| 1,563,055 | 11/1925 | Whallon. | |
| 2,552,977 | 5/1951 | Klotz. | |
| 2,576,222 | 11/1951 | Hill. | |
| 2,612,207 | 9/1952 | Branson. | |
| 2,628,750 | 2/1953 | Palmer. | |
| 3,229,874 | 1/1966 | Schneider et al. | |

FOREIGN PATENTS

| | | |
|---|---|---|
| 63,784 | 7/1949 | Netherlands. |
| 93,810 | 12/1938 | Sweden. |

MARVIN A. CHAMPION, *Primary Examiner.*

GERALD M. FORLENZA, *Examiner.*

F. E. WERNER, *Assistant Examiner.*